Figure 1:
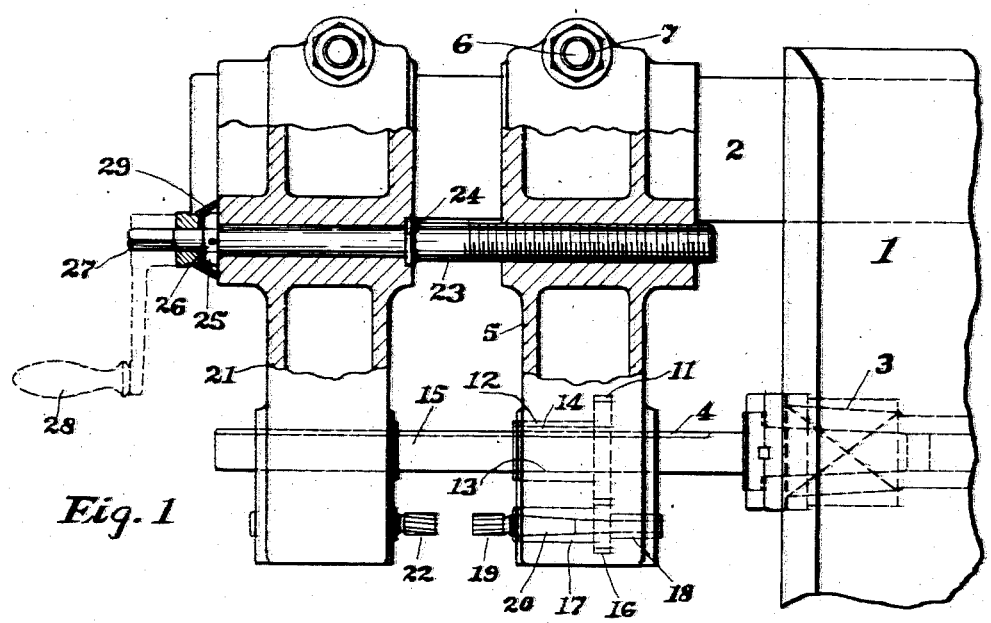

Feb. 7, 1928.

T. TRECKER 1,658,267

ATTACHMENT FOR MACHINE TOOLS HAVING A PLURALITY OF OVERARMS

Original Filed Nov. 1, 1923

Theodore Trecker
INVENTOR.

BY Fred G. Parsons
ATTORNEY.

Patented Feb. 7, 1928.

1,658,267

UNITED STATES PATENT OFFICE.

THEODORE TRECKER, OF MILWAUKEE, WISCONSIN, ASSIGNOR TO KEARNEY & TRECKER CORPORATION, OF WEST ALLIS, WISCONSIN, A CORPORATION OF WISCONSIN.

ATTACHMENT FOR MACHINE TOOLS HAVING A PLURALITY OF OVERARMS.

Application filed November 1, 1923, Serial No. 672,227. Renewed December 20, 1927.

This invention relates to an attachment for machine tools having a plurality of overarms, and more particularly to an attachment for the type of machine tool commonly known as a horizontal knee type milling machine.

In such machine a considerable variety of attachments arranged to be driven or actuated from the spindle of the machine tool, and to be supported from the column of the machine, are in common use. Such attachments ordinarily include one or more auxiliary tool spindles, adapted, when the attachment is in place, to enable certain classes of work to be executed with greater convenience or economy than is possible when using only the tool spindle which is incorporated in the machine structure.

For some work it adds considerably to the convenience of the attachment if the auxiliary spindle is relatively movable, either relative to the column and machine structure, or relative to other auxiliary spindles, or both, and in any case it is necessary that the auxiliary spindle should be firmly fixed to be supported from the column of the machine and having certain of its driving members in exact alignment relative to the spindle of the milling machine.

It is the purpose of this invention to provide a simplified adjustment and support for attachments as above described wherein full advantage will be taken of parts of the machine structure itself.

Another purpose is to generally simplify and improve the construction and operation of attachment of the type noted above, and to simplify and improve the means whereby the attachment is firmly fixed to be supported from the machine structure.

Another object is to provide an attachment adjustment whereby an auxiliary spindle may be conveniently adjusted in a direction parallel to the axis of the machine spindle, while maintaining its alignment in other directions and with the greatest simplicity of special guides or slideways.

Other objects will be in part apparent from this specification, and in part from the accompanying drawings and claims.

In the drawings like reference characters designate the same parts in the various views, wherein:

Figure 1 is a side elevation, partly in section, of an attachment embodying the invention, shown mounted upon a machine tool of the type known as a horizontal knee type milling machine, of which only a portion is shown. The cross sectional portion of Figure 1 is taken along the line 1—1 of Figure 2.

Figure 2:
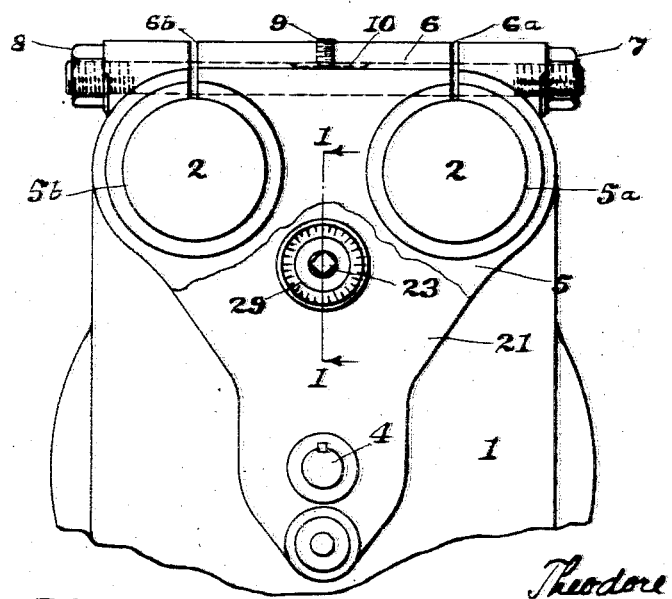

Figure 2 is a front elevation of the attachment and a portion of the machine in which a portion of one of the attachment members is broken away and showing the overarms and a portion of the column. The complete machine structure is not shown since this type of machine is one well known to all who are familiar with the machine tool art, and only so much is shown as is necessary to illustrate my invention.

The milling machine includes a column 1, supporting a pair of overarms 2 and a spindle 3 which is rotatably mounted as in usual practice but for which the driving arrangements are not shown, since no part of the present invention resides in the spindle driving train.

In the spindle 3 is removably fixed, for rotation therewith, an arbor or driving shaft 4, which may, as will be later explained, cause auxiliary attachment spindles to be actuated from the machine spindle 3.

5 is an attachment housing or member having two parallel cylindrical bores 5ª and 5ᵇ slidably engaging the respective overarms, the bores forming a slideway whereby the member 5 may be adjusted along the overarms. The member 5 may be rigidly fixed or clamped in position by slotting portions which engage the arms 2 as at 6ª and 6ᵇ, and employing a clamp bolt 6 having threaded ends engaged by the nuts 7 and 8. To prevent the bolt 6 from turning when either nut is turned, a screw 9 threaded in member 5, may engage a flat 10 on the bolt.

A gear 11 having an extended portion 12 is provided with a suitable bearing in the member 5 and is thereby rotatably supported in such a position that when the member 5 is clamped upon the overarms, the bore 13 of the gear will exactly align with the arbor 4 which passes thru the bore, and may drive the gear thru the key 14, which is fixed in the gear. Both the gear 11 and the key 14 are slidable in relation to the arbor 4, the keyway 15 in the arbor being extended for this purpose as shown in Figure 1.

Gear 16 meshes with the gear 11, to be rotated thereby when gear 11 is rotated, and is provided with suitable extensions 17 and 18, having bearings in member 5 adapted to support the gear when rotated. The extensions 17 and 18 form in effect a spindle, in which a cutter 19 may be supported, by means such as a tapered shank portion 20 engaging a tapered mating bore in the extension 17, or by other suitable means.

The foregoing description of the method of supporting and clamping the member 5 with the overarms 2 may be understood as applying equally to a member 21 similarly supported and clamped, and the mechanism above described for driving the cutter 19 from the arbor 4 may be understood as being exactly similar to the mechanism for driving another cutter 22 similarly supported for rotation in the member 21.

A screw member 23 engages a threaded bore in the member 5 and has a bearing provided for rotation in the member 21, there being a shoulder 24 on the screw adapted to seat against the member 21 on the one side, and a collar 25 fixed with the screw 23 by means of the pin 26, and adapted to seat against the member 21 on the other side, whereby the screw is axially fixed with the member 21, altho it may be rotated. A squared end portion 27 of the screw 23 is adapted for engagement by a removable crank 28 for the manual rotation of the screw.

29 is a graduated dial indicating the amount of the manual rotation of screw 23.

The overarms 2 of the milling machine, together with the parallel bores in the housings or members 5 and 21, provide slides for guiding the attachment members 5 and 21 in a direction parallel to the axis of the machine spindle 3, and for preventing their movement in any other direction and for positively aligning the gear 11 with the arbor 4.

By clamping the member 21 and loosening the member 5 on the overarms 2, and by subsequently rotating the screw 23, the member 5 may be readily adjusted along the overarms in a direction parallel to the axis of the arbor 4 and by a predetermined amount as registered by the graduated dial 29; or the member 5 may be clamped and the member 21 loosened for a similar adjustment of the member 21; or first the one and then the other may be thus adjusted, whereby both may arrive at positions differing by a predetermined amount from their respective previous position relative to the column 1 and to each other, as desired.

Having now fully revealed my invention, I claim:

1. In an attachment for machine tools having a plurality of overarms, the combination of a housing providing a tool support, a plurality of parallel bores in the housing adapted for slidable engagement with the overarms of the machine tool, means for bodily adjusting said housing along said overarms, and a housing locating clamp adapted to frictionally engage one of said overarms.

2. In an attachment for machine tools having a plurality of overarms, the combination of a plurality of independently movable attachment members each having a plurality of parallel bores adapted for slidably engaging said overarms, a plurality of clamps for independently fixing said members with one of said overarms, and an adjusting screw connecting said members, whereby either of said members may be bodily adjusted along said overarms.

3. In an attachment for machine tools having a plurality of overarms, the combination of a housing having a plurality of parallel slotted bores slidably engaging with the respective overarms, a tool spindle rotatably supported therefrom, a gear rotatably supported from said housing and in axial parallelism with said bores, a mechanical train connecting said gear and said tool spindle means for adjusting said housing along said overarms, and a clamp bolt for simultaneously contracting said slots.

THEODORE TRECKER.